United States Patent [19]

Hicks, Jr.

[11] 4,405,890

[45] Sep. 20, 1983

[54] RECHARGEABLE GLOW PLUG ENERGIZER

[76] Inventor: Wilford L. Hicks, Jr., 3421 Biggs, Omaha, Nebr. 68123

[21] Appl. No.: 289,506

[22] Filed: Aug. 3, 1981

[51] Int. Cl.³ .................... H02J 7/02

[52] U.S. Cl. .................... 320/2; 219/268; 361/264

[58] Field of Search .................... 219/267, 268, 270; 361/264, 265, 266; 123/142, 145 R; 320/2, 5, 14, 36; D13/5

[56] References Cited

U.S. PATENT DOCUMENTS

| | | | |
|---|---|---|---|
| 3,017,541 | 1/1962 | Lawser | 361/266 X |
| 3,437,880 | 4/1969 | Profuser | 361/264 |
| 3,448,365 | 6/1969 | Jacobson | 219/268 X |

*Primary Examiner*—Volodymyr Y. Mayewsky
*Attorney, Agent, or Firm*—Zarley, McKee, Thomte, Voorhees & Sease

[57] ABSTRACT

A hand held rechargeable glow plug igniter includes a rechargeable battery, an extension member electrically connected to one terminal of the battery and extended outwardly therefrom and a Headlock connector mounted on the opposite end of the extension member for establishing electrical connection between the battery and the glow plug of a model airplane engine. A recharger unit for the glow plug igniter includes an AC adapter, the DC output of which is directed to a plug having a probe end of one polarity and a wider diameter base end of opposite polarity with a conductive peripheral contact member connected to the base end for releasable engagement by the Headlock connector.

8 Claims, 8 Drawing Figures

RECHARGEABLE GLOW PLUG ENERGIZER

BACKGROUND OF THE INVENTION

The present invention relates generally to a device for starting glow fuel combustion engines and more particularly to a hand held rechargeable glow plug igniter adapted for quickly and easily starting the engines of all scale models that utilize a glow plug equipped engine.

Glow plug equipped engines are now in common use for model boats, cars, helicopters and airplanes, for example. Such engines can be started by simply electrically connecting the glow plug to a battery by means of a Headlock connector. When the engine starts, the Headlock connector is removed.

Whereas, the Headlock connectors have greatly facilitated the starting of model airplane engines, there are, nevertheless, certain problems attendant to their use. First, connection of a Headlock connector to a battery can be time-consuming and difficult as the wire leads from the Headlock connector must be either twisted or soldered onto the battery posts. Likewise, the flexible wire connection between the Headlock connector and battery leaves them somewhat difficult to handle as a unit. Finally, scale models are made in various sizes and shapes. In many radio-controlled scale model airplanes, for example, the cowling is so shaped that the glow plug of the engine is recessed interiorly of the cowling by a dimension too long to be reached by a standard Headlock connector.

Accordingly, a primary object of the present invention is to provide an improved glow plug energizer.

Another object is to provide a unitary hand held rechargeable glow plug energizer.

Another object is to provide a glow plug energizer wherein the Headlock connector is secured relative to an associated rechargeable battery.

Another object is to provide a glow plug igniter wherein the Headlock connector is extended outwardly from the battery by an extension member for insertion through an airplane cowling to reach a recessed glow plug.

Another object is to provide a glow plug igniter which may be quickly and easily recharged.

Finally, another object is to provide a glow plug igniter which is simple and rugged in construction, economical to manufacture and efficient in operation.

SUMMARY OF THE INVENTION

The hand held rechargeable glow plug energizer of the present invention includes a rechargeable battery, an extension member connected to one terminal of the battery and extended outwardly therefrom and a Headlock connector secured to the free end of the extension member and electrically connected to the opposite terminal of the battery. The assembled parts form a relatively small hand held unit which can be easily connected to the glow plug of any glow fuel combustion engine. The combined length of the extension member and Headlock connector enables the Headlock connector to be easily connected to even those glow plugs which are substantially recessed, such as within the cowlings of certain scale model airplanes.

An AC adapter is provided for use with the glow plug energizer whereby the rechargeable battery may be easily recharged by simply connecting a special plug to the Headlock connector in much the same manner as it is adapted for connection to a glow plug. The plug has an elongated probe or free end of one polarity and a base end of opposite polarity with a conductive peripheral contact member electrically connected to it for engagement by the Headlock connector.

DESCRIPTION OF THE PREFERRED EMBODIMENT

Figure 1:
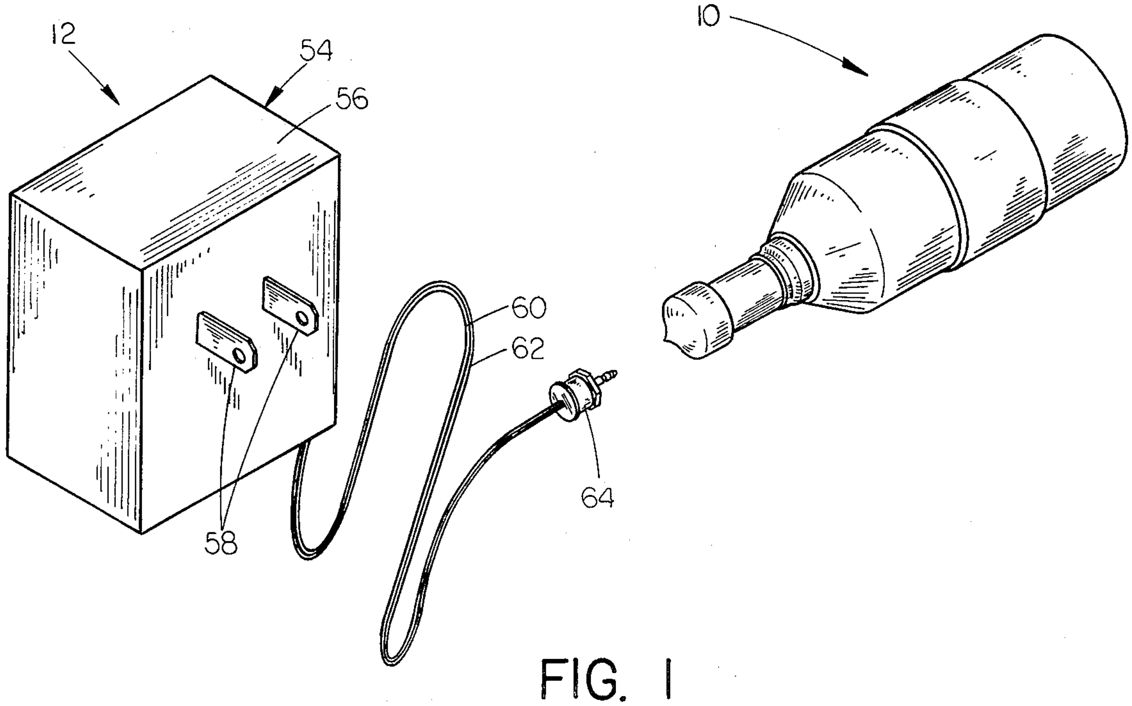
FIG. 1 is a perspective view of the glow plug energizer and recharger unit.

The hand held rechargeable glow plug energizer 10 of the present invention is shown in FIG. 1 in association with its recharger unit 12. The glow plug igniter 10 is shown in FIG. 2 with the external plastic coverings removed and FIG. 3 shows all of the parts thereof in exploded fashion.

Figure 2:
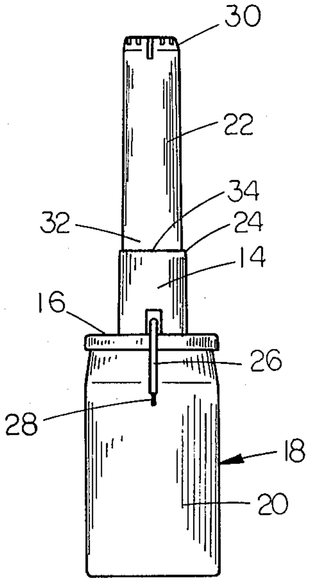
FIG. 2 is a side view of the glow plug energizer with the heat shrink plastic coating removed.
Figure 3:
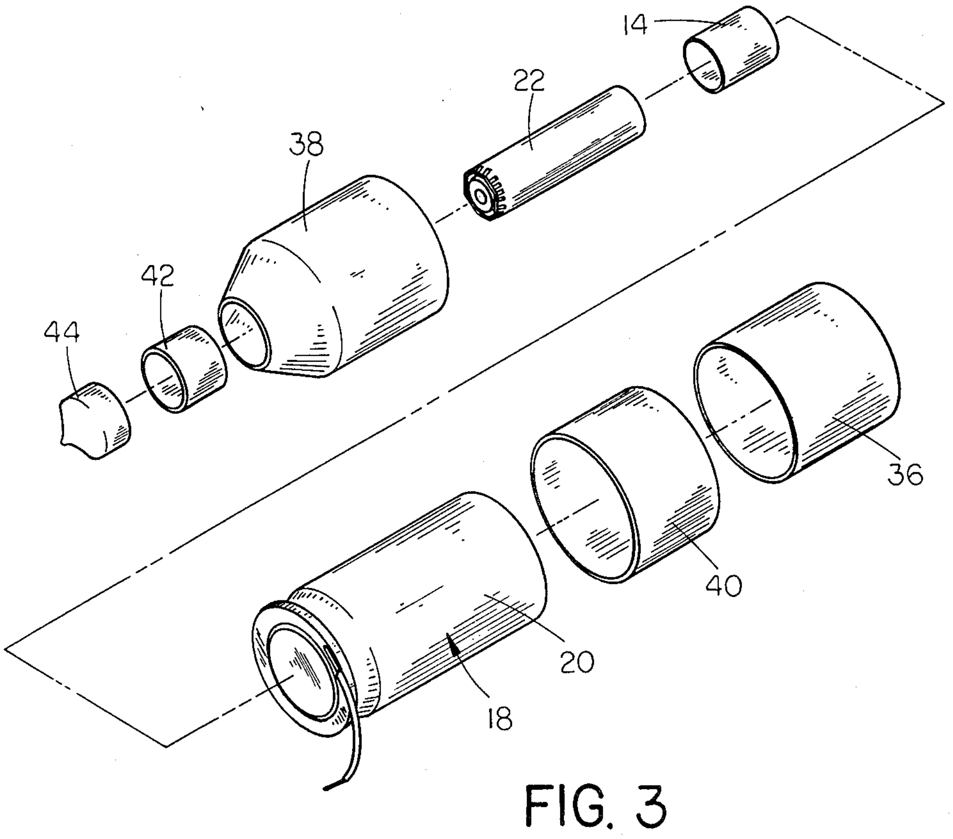
FIG. 3 is an exploded view of the glow plug energizer.

Referring to FIG. 2, an electrically conductive extension member 14 is both structurally and electrically connected to one terminal 16 of a rechargeable battery 18. In this case, the one terminal 16 is the top end which closes the otherwise open topped casing 20 which comprises the opposite terminal of the battery. Top end 16 is electrically insulated from casing 20 as indicated at 17 in FIG. 3.

A Headlock connector 22 is secured to the free end 24 of extension member 14 in electrical contact therewith and a wire lead 26 extends over and down battery 18 for electrical connection to the casing portion 20 at 28. Accordingly, there is shown in FIG. 2 the fixed subassembly of the extension member 14, battery 18 and Headlock connector 22.

The Headlock connector 22 is commercially available from Model Products Corp. of Pompton Plains, New Jersey, 07444. As purchased, the Headlock connector includes a free end 30 adapted for connection to a glow plug and a plastic nut secured to the opposite end 32 thereof. That nut is removed prior to installation of the Headlock connector 22 into the present invention and accordingly, it is not shown in the drawings. The free end 30 of Headlock connector 22 presents two terminals for completing an electrical circuit with a glow plug. A centrally disposed and axially depressable probe-receiving cylinder 70 is electrically connected to a wire 26 for connection to the casing 20 of the battery 18. The electrically conductive outer casing 23 acts as the second terminal and is soldered to the electrically conductive extension member at 34 to establish direct electrical contact therebetween. The second lead wire 27 from the casing 23 of the Headlock connector is therefore cut off as shown in FIG. 3.

In FIG. 3, the resulting modified Headlock connector 22 is shown in exploded relation to the extension member 14 and rechargeable battery 18. The entire assembly as shown in FIG. 1 also includes a generally cup-shaped plastic base 36 into which the battery casing 20 is slidably fit and a tapered plastic sleeve 38 which covers the upper portion of battery 18. A plastic identification sleeve 40 covers the joint between base 36 and sleeve 38 and may bear the manufacturer's trademark and identification. Similarly, a plastic sleeve 42 covers the soldered connection between the Headlock connector 22 and extension member 14 and a cap 44 is provided for sealing the free end 30 of the Headlock connector 22. The various plastic members 36, 38, 40, 42 and 44 may be formed of heat shrink plastic so as to present a tight attractive coating for the assembled glow plug energizer 10.

Figure 4:
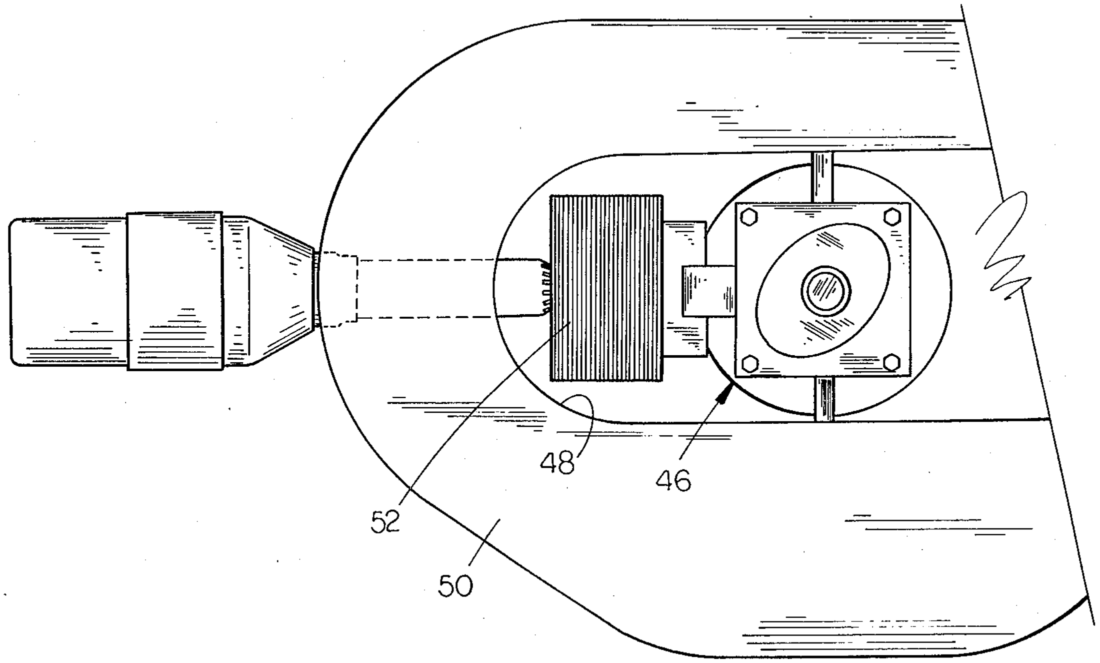
FIG. 4 is a front view of a model airplane showing the glow plug energizer inserted through the cowling thereof.
Figure 7:
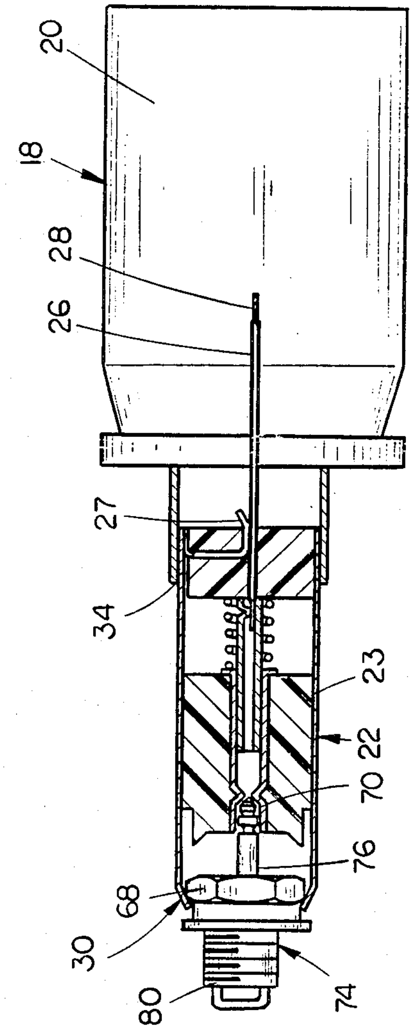
FIG. 7 is a partially sectional side view of the assembled energizer.
Figure 8:
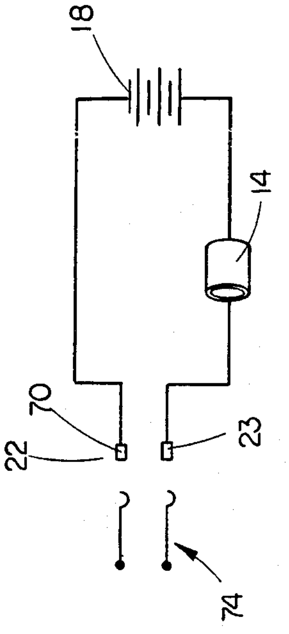
FIG. 8 is an electrical circuit diagram for the energizer.

FIG. 4 shows an engine 46 as seen through the front opening 48 in the cowling 50 of a scale model airplane. A conventional glow plug is situated in its usual position at the head of the engine cylinder 52. Access to the glow plug is provided through an opening in the side wall of the cowling 50. As often happens, the cowling is so shaped that the glow plug is substantially recessed interiorly of the side wall opening so as to be practically inaccessible by a conventional Headlock connector. Since the reach of the Headlock connector 22 of the present invention is extended to any desired length by the extension member 14, however, even such recessed glow plugs are easily accessible by the glow plug energizer 10 of the present invention as indicated in FIG. 4.

The rechargeable battery 18 may be provided as a 1200 MAH rated nickel cadmium (Nicad) battery which is operative to start the engine of a scale model airplane approximately 50 times. For additional starts, the battery must be recharged.

For this purpose, the recharger unit 12 is provided which includes an AC adapter 54 consisting of a housing 56 having a pair of prongs 58 extended therefrom for electrical connection to a standard wall outlet. Such AC adapters are readily commercially available. An adapter having a rating of 117 V, 60 cycles, 3 W and 6.5 V.D.C. and 20 M.A. output is suitable. The DC output is connected by wires 60 and 62 to a plug 64.

Figure 5:
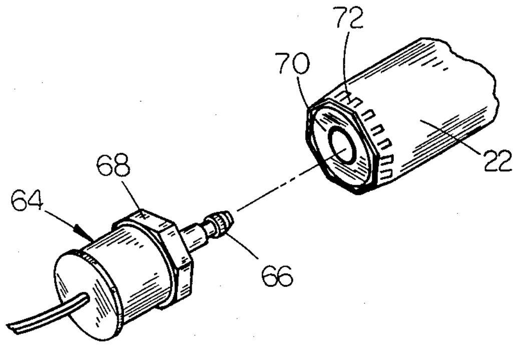
FIG. 5 is a perspective view of the recharger plug and free end of the Headlock connector.

Plug 64 is shown in FIG. 5 as including an extended probe end 66 of one polarity and the larger diameter opposite end portion of opposite polarity. Plug 64, as thus far described, is of conventional construction.

Figure 6:
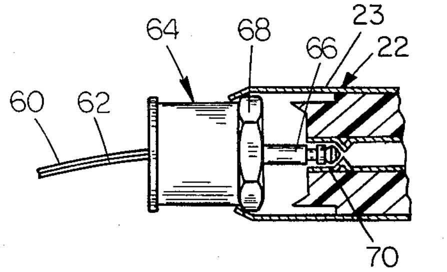
FIG. 6 is a partially sectional side view showing the recharger plug removably secured within the end of the Headlock connector.

The improvement provided by the present invention is directed to the conductive peripheral contact member 68 which is electrically connected to the base end and which presents a peripheral shoulder which extends outwardly beyond the diameter of the base end as shown in FIGS. 5 and 6. Contact member 68 is provided as a hexagonal nut in the embodiment shown in the drawings.

Plug 64 enables the battery 18 to be quickly and easily recharged even though it is concealed within the plastic wrappings of the glow plug energizer. All that is required is that the Headlock connector 22 be fitted onto plug 64 in the same manner in which it is releasably connected to a glow plug for starting an airplane engine. Specifically, referring to FIG. 5, the probe end 66 of plug 64 is inserted into the tubular and depressable portion 70 of Headlock connector 22 with the peripheral hexagonal shape of contact member 68 aligned with the crimped hexagonal end 72 of the Headlock connector. Upon insertion of the aligned contact member within the crimped open end 72 of the Headlock connector, a simple twist of the Headlock connector releasably locks it onto plug 64 as shown in FIG. 6. Once the battery is fully charged, it is only necessary to twist the plug 64 to realign the nut 68 with the open crimped end 72 for removal of the plug from the Headlock connector. As is well known in the art, a glow plug 74 closely resembles plug 64 except that the end opposite the probe 76 carries a filament and is externally threaded at 80 for insertion into the engine cylinder head 52. The glow plug is physically and electrically connectable to the Headlock connector in the same manner as described above for plug 64.

Whereas a preferred embodiment of the invention has been shown and described herein, many modifications, alterations and substitutions may be made within the intended broad scope of the appended claims. For example, whereas it is preferred that the extension member 14 be provided as a 7/16ths inch diameter brass ring for optimum electrical conduction, this is not critical. It is advantageous, however, in that the soldered connections between the extension ring and the battery and Headlock connector enable greater amperage to be conducted to the glow plug. A nonconductive extension member with suitable wires provided for making the electrical connection between the Headlock connector and battery could be substituted.

It is apparent that the extension member and Headlock connector need not necessarily be mounted on the top end of the battery as they would also be operative if mounted on the opposite end or side wall of the battery. Similarly, whereas the extension member is shown as a relatively short cylindrical tube, it could otherwise be made longer, shorter or bent at any desired angle. The improved plug 64 may be manufactured by modifying conventional plugs to add the peripheral contact member 68 or an entirely new plug so equipped might be designed.

The glow plug energizer of the present invention may be comfortably hand held and is completely rechargeable. It is insertable through the engine cowling and is adapted for attachment to any size engine that uses glow plugs. The small size of the glow plug energizer readily adapts it for easy transport in a flight box or pocket.

Accordingly, there has been shown and described herein a glow plug energizer which accomplishes at least all of its stated objects.

I claim:

1. A hand held rechargeable energizer for energizing the glow plug of a glow fuel combustion engine comprising, a rechargeable battery having oppositely charged terminal portions, an extension means having one end connected to one terminal portion of said battery and an opposite end extended outwardly therefrom, a Headlock connector having a free end having a pair of terminals adapted for releasable electrical connection to a glow plug and a rechargeable plug of a recharger unit and an opposite base end connected to said opposite end of the extension means so that said free end extends outwardly from said battery by a distance greater than the length of said Headlock connector, one terminal of said Headlock connector being electrically connected to said one terminal of the battery, and means for electrically connecting the other terminal of the Headlock connector to the opposite terminal portion of the battery.

2. The energizer of claim 1 wherein said extension means comprises an elongated annular ring.

3. The energizer of claim 2 wherein said extension means is substantially straight.

4. The energizer of claim 1 wherein said battery has a generally cylindrical shape including a side wall and opposite ends, said extension means being connected to one end of said battery and arranged concentric with the longitudinal axis thereof.

5. The energizer of claim 1 wherein said extension means is formed of an electrically conductive material, said one end being electrically connected to said one terminal portion of the battery and the opposite end being electrically connected to the base end of the Headlock connector.

6. The energizer of claim 1 wherein said battery includes an open topped casing and a top end closing said casing and comprising said one terminal portion, said extension means being connected to said top end of the battery.

7. The energizer of claim 1 wherein said one terminal of the Headlock connector comprises an electrically conductive outer casing thereof, said extension means being electrically conductive and operative to electrically connect said Headlock casing to said one terminal portion of the battery.

8. The energizer of claim 7 wherein said Headlock connector includes a wire connected at one end to the other terminal thereof, the other end of said wire being electrically connected to the other terminal portion of the battery.

* * * * *